United States Patent [19]
Bak

[11] 3,955,511
[45] May 11, 1976

[54] ADJUSTABLE STAND FOR APPLIANCES

[76] Inventor: Walter L. Bak, 22534 Pleasant Drive, Richton Park, Ill. 60471

[22] Filed: Feb. 3, 1975

[21] Appl. No.: 546,685

[52] U.S. Cl. .............................. 108/137; 108/59; 108/157; 248/172
[51] Int. Cl.² ........................................ A47B 11/00
[58] Field of Search ............... 108/137, 143, 59, 93, 108/102, 157, 83; 248/172, 188.1; 280/79.1, 79.2; 211/175, 126, 133

[56] References Cited
UNITED STATES PATENTS

| 854,381 | 5/1907 | Rawlinson........................ 248/172 X |
| 1,872,740 | 8/1932 | James............................ 108/137 X |
| 2,749,071 | 6/1956 | Remstein ........................... 248/172 |
| 2,772,063 | 11/1956 | Remstein ........................... 248/172 |
| 2,909,400 | 10/1959 | Johnston et al..................... 248/172 |
| 3,812,836 | 5/1974 | Jackson ............................. 248/172 |

FOREIGN PATENTS OR APPLICATIONS

| 852,772 | 11/1960 | United Kingdom.................. 108/59 |
| 227,497 | 3/1960 | Australia............................ 248/172 |

Primary Examiner—James T. McCall
Attorney, Agent, or Firm—Gary, Juettner, Pyle & Cullinam

[57] ABSTRACT

An appliance stand, suitable for supporting portable television sets and the like, includes easily assembled frame members which provide superior strength. The stand is adjustable in width by means of a telescoping framework to accommodate appliances of various widths, and a removable longitudinal structural member is used as a measuring guage during assembly of the stand to assure that the correct width is attained for a particular appliance.

8 Claims, 5 Drawing Figures

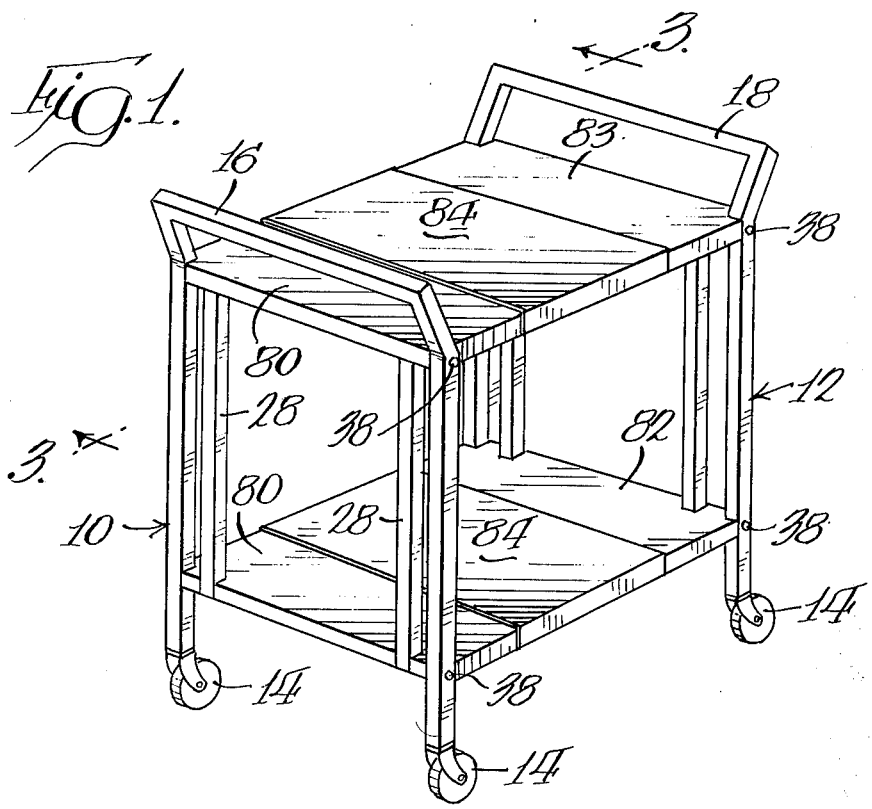
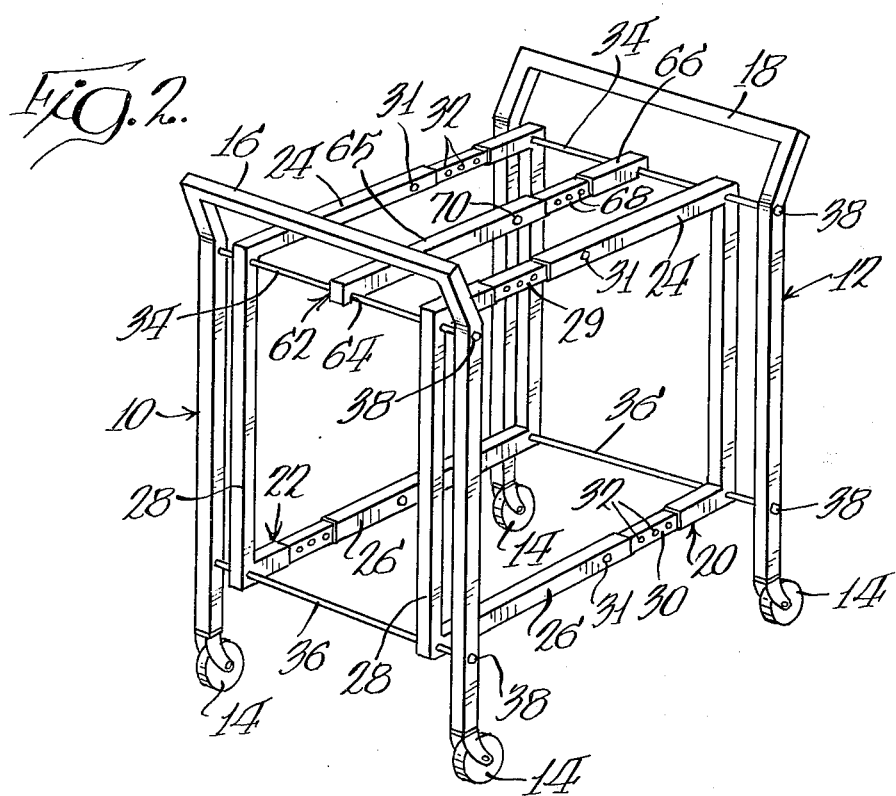

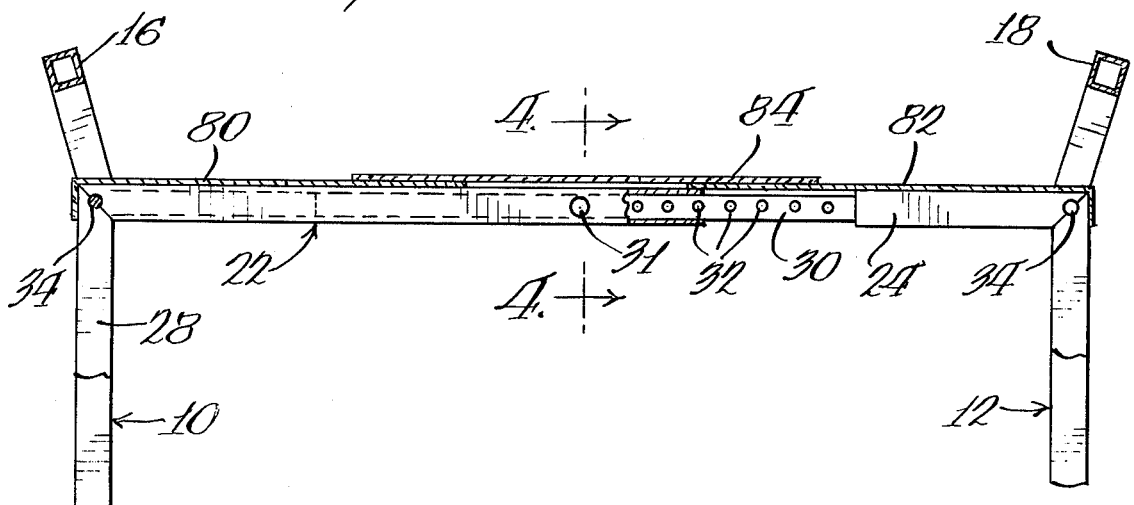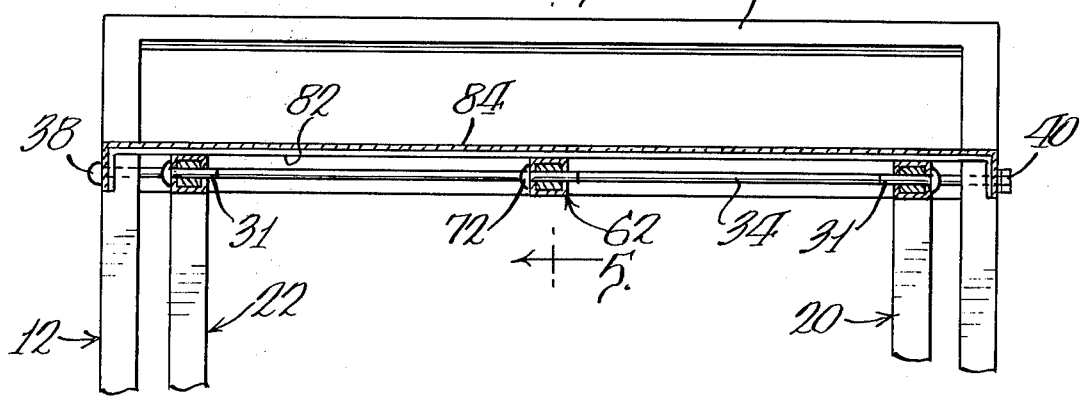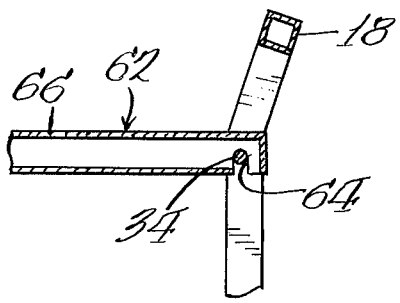

ADJUSTABLE STAND FOR APPLIANCES

BACKGROUND OF THE INVENTION

Stands or supports for portable appliances such as television sets are normally constructed to accommodate an appliance of a particular size. Unless an appropriate stand is furnished with the appliance, the consummer is confronted with the sometimes impossible task of finding a stand of the desired size. Appliance dealers are reluctant to maintain an adequate stock of various size stands because they constitute a small sales item, and inventory control is too burdensome in view of the lrge variety of available sizes.

An additional problem with existing stands, especially portable television stands, is that they are constructed very weakly and tend to be limited in height to about 14 to 18 inches, which is often too low for convenient viewing of a television set supported thereon. A further difficulty is that most stands are furnished in a disassembled condition, and assembly by the average consumer is often very difficult, usually requiring a high degree of mechanical skill and special tools.

SUMMARY OF THE INVENTION

The present invention provides a portable appliance stand that is low in cost, easy to assemble, and very sturdy. At the same time, the width of the entire stand may be easily adjusted to accommodate appliances of various widths. The stand comprises rectangular longitudinal frame members that are interconnected by cross members to provide an exceptionally sturdy support.

The rectangular frame members include respective external-internal telescoping portions that permit adjustment of the length of the members. In addition, a separate and removable adjustable member extends between the cross members and serves as a guage or measuring device for a particular appliance, in order that the dimensions of the stand, upon assembly, will be adjusted correctly to accommodate the dimensions of the appliance.

THE DRAWINGS

FIG. 1 is a perspective view of the adjustable appliance stand of the present invention.

FIG. 2 is a perspective view of the stand similar to FIG. 1, but illustrating the top and bottom cover assemblies as being removed to reveal the inner framework.

FIG. 3 is a sectional view taken substantially along section line 3—3 of FIG. 1.

FIG. 4 is a sectional view taken substantially along section line 4—4 of FIG. 3.

FIG. 5 is a sectional view taken substantially along section line 5—5 of FIG. 4.

DESCRIPTION OF THE PREFERRED EMBODIMENTS

Referring to the drawings and particularly to FIG. 2, the stand of the present invention is generally rectangular in shape and comprises a pair of spaced end members 10 and 12 of inverted U-shape, with the vertical portions thereof constituting the four corners of the stand. The end members 10 and 12 may be constructed from rectangular metal tubing, and a conventional pivotable wheel 14 or the like may be mounted on the lower ends of each member to provide mobile support for the stand. The upper portion of each member 10 and 12 may be bent outwardly to form respective handles 16 and 18 to carry or move the stand from one location to another. The end members 10 and 12 in effect each constitute a pair of spaced vertical legs rigidly connected by a cross member.

Extending between vertical portions of the end members 10 and 12, and spaced slightly inwardly therefrom, are a pair of spaced rectangular frame members 20 and 22, which serve as the primary longitudinal support for the stand. The upper horizontal beam 24 of each member 20 and 24 provides the primary direct support for the appliance (not shown), and the beams are in a horizontal plane spaced below the level of the handles 16 and 18. The lower horizontal beam 26 of each member is spaced upwardly from the lower ends of the end members 10 and 12. Preferably, the rectangular frame members 20 and 22 are equi-sized and parallel and have vertical members, such as 28, at each end which are in parallel with the vertical portions of the corresponding end member 10.

The length of each rectangular frame member 20 and 22 is adjustable by means of telescoping portions in the upper and lower horizontal beams, 24 and 26, of each. For example, as shown in FIGS. 2 and 3, the rectangular frame member 20 comprises two relatively movable portions connected together by sliding telescoping sections indicated at 28 and 30 in the respective upper and lower beams 24 and 26 thereof. The telescoping sections 28 and 30 each comprise a length of reduced diameter tubing projecting from one portion and extending into and slidably received by the open tube end in the other portion.

It will be appreciated that the portions of reduced diameter comprising the telescoping sections 28 and 30 may be coextensive with the entire length of the beams 24 and 26; hence, an increase in length of each frame member 20 and 22 to slightly less than twice the original length is possible. In addition, a series of alignable apertures 32 may be provided through the telescoping sections 28 and 30 to allow insertion of a suitable retainer or stop, such as a pin 31 (FIG. 4) to hold the members in the desired adjusted position. It will be noted that the telescoping sections 28 and 30 are located adjacent one of the corners of the frame to provide better stability and are preferably located adjacent diagonally opposite corners as shown.

Upper and lower transverse horizontal tie rods 34 and 36 are provided at each end of the stand to connect the end members 10 and 12 and the rectangular frame members 20 and 22 together. As shown in FIGS. 2 and 5, the tie rods 34 and 36 extend through apertures in corresponding corners of the frame members 20 and 22 and through aligned apertures in the vertical portions of the end members 10 and 12. The rods 34 and 36 are restrained against axial movement by means of a suitable head 38 at one end and a suitable nut 40 or other removable retainer at the other end (FIG. 5).

In addition, one or more intermediate adjustable longitudinal members 62 may be provided to span one or both of the upper or lower pairs of tie rods 34 and 36, as shown in FIGS. 2, 4 and 5. The intermediate member 62 has a downwardly facing recess 64 at each end thereof adapted to engage over the respective pairs of rods 34 or 36, and is therefore easily removed from and connected to the structure. The member 62 comprises a pair of tubular sections 64 and 66, one of which 66 has a portion of reduced diameter adapted to slidably telescope into the open end of the other section 64, whereby the composite member 62 is adjustable in length. The reduced diameter portion of section 66 has a series of apertures 68 therethrough alignable with an aperture 70 through section 64. In this manner, a suitable retainer or pin 72 (FIG. 4) may be inserted through the apertures at the desired length.

As will be more fully explained, the removable member 62 may be used as a measuring device to determine the length of the appliance to be supported on the stand. Thereafter, the length of the stand may be adjusted to the length of the member 62 without the necessity of using separate measuring instruments. Provided that a retainer is used to fix the length of the intermediate member 62, the retainers through the other telescoping sections of the stand may be eliminated.

Optionally, a telescoping cover assembly may be provided for the upper and lower horizontal portions of the framework. As best shown in FIGS. 1 and 3, each of the assemblies comprises a pair of end covers 80 and 82, each of which has outer end and side flanges overlapping the frame members and being retained thereby. In addition, a central cover 84 is slidably fitted over an intermediate portion of the end covers 80 and 82. As shown in FIG. 3, the central cover 84 covers the gap created between the inward edges of the end covers 80 and 82 when the stand is expanded beyond its most narrow configuration.

In the construction of the stand of the present invention, I have found that the most variable dimension among small appliances such as television sets is the width, and the depth of the stand may be designed to be large enough to accommodate most appliances. It will be appreciated however, that the depth could also be changed by providing different length end members 10 and 12 and corresponding tie rods 34 and 36.

The assembly of the entire stand may now be easily visualized. The tie rods 34 and 36 are threaded through the longitudinal frames 20 and 22 and the end members 10 and 12 and are secured. The intermediate member 62 is then held across the appliance to be supported, and the length of said member is adjusted to be coextensive with the width of the appliance, whereupon the pin 72 is inserted. The member 62 is then hooked over the tie rods 34 or 36, adjustments being made to the width of the stand to accommodate this assembly. Thereaftr, the covers 80, 82 and 84 may be installed.

Due to the sturdy construction of the stand of the present invention, it is possible to construct a taller than conventional stand without added expense. A stand height of about 24 inches for supporting an 80 pound television set is easily accomplished. The use of rectangular section steel tubing, normally ¾ inch, 20 guage, for the end members and longitudinal members provides high strength at a low cost.

I claim:

1. A stand for appliances and the like comprising a pair of spaced inverted U-shaped members, each of said U-shaped members defining an upper handle and a pair of vertical support legs for said stand, a pair of spaced rectangular structural members disposed within said U-shaped members in vertical planes and extending between said U-shaped members to define therewith a rectangular stand, said rectangular members having vertical portions coextensive with respective portions of said vertical support legs, and a pair of spaced tie rod means extending across each of said inverted U-shaped members and connected to said rectangular members.

2. The stand of claim 1 wherein said rectangular members comprise telescoping horizontal portions for adjusting the length of said stand.

3. The stand of claim 2 further comprising a beam member supported across opposite tie rod means, said beam member being adjustable in length corresponding to the adjusted length of said stand.

4. The stand of claim 2 comprising means for holding said adjustable frames at a given length.

5. The stand of claim 1 wherein telescoping cover means are provided on said horizontal portions for supporting an object thereon.

6. The stand of claim 4 wherein the means for holding said frames at a particular length comprises removable stop means in said telescoping means.

7. The stand of claim 4 wherein the means for holding said frames at a particular length comprises a longitudinal member removably attached at its ends to corresponding ends of said stand.

8. The stand of claim 7 wherein said longitudinal member comprises a pair of telescoping members adjustable as to length, and means for holding said members in an adjusted position.

* * * * *